(12) United States Patent
Witte

(10) Patent No.: US 9,379,534 B2
(45) Date of Patent: Jun. 28, 2016

(54) RECLOSER DEVICE AND METHOD OF OPERATION

(71) Applicant: John Witte, Washingtonville, NY (US)

(72) Inventor: John Witte, Washingtonville, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 507 days.

(21) Appl. No.: 13/798,630

(22) Filed: Mar. 13, 2013

(65) Prior Publication Data

US 2014/0277804 A1    Sep. 18, 2014

(51) Int. Cl.
*H02H 3/093* (2006.01)
*G06F 1/30* (2006.01)
*H01H 43/00* (2006.01)
*H02H 3/06* (2006.01)

(52) U.S. Cl.
CPC *H02H 3/093* (2013.01); *H02H 3/06* (2013.01)

(58) Field of Classification Search
CPC .................................. H02H 3/093; H02H 3/06
USPC ............................. 700/292, 293; 361/71, 211
See application file for complete search history.

(56) References Cited

U.S. PATENT DOCUMENTS

| | | | |
|---|---|---|---|
| 4,307,380 A | | 12/1981 | Gander |
| 4,454,556 A | | 6/1984 | DePuy |
| 4,466,074 A | * | 8/1984 | Jindrick .................. G01R 21/00 327/545 |
| 4,600,962 A | | 7/1986 | Bliehall |
| 4,724,391 A | | 2/1988 | Blahous |
| 4,845,594 A | * | 7/1989 | Wilkerson ................ H02H 3/48 361/71 |
| 4,912,591 A | * | 3/1990 | LeCourt .................. H02H 3/093 361/75 |
| 4,931,896 A | * | 6/1990 | LeCourt .................... H02H 3/07 361/73 |
| 5,099,145 A | | 3/1992 | Higasa et al. |
| 5,303,112 A | * | 4/1994 | Zulaski .................. H02H 7/261 361/67 |
| 5,896,302 A | * | 4/1999 | Goodpaster ........ G05B 19/0428 361/71 |
| 6,369,996 B1 | * | 4/2002 | Bo ........................... H02H 7/30 361/80 |
| 6,721,671 B2 | | 4/2004 | Roberts |
| 6,768,620 B2 | * | 7/2004 | Kim et al. ........................ 361/59 |
| 6,907,321 B2 | * | 6/2005 | Kearney ................ H02H 7/266 700/292 |
| 7,110,231 B1 | * | 9/2006 | De La Ree ............. H02H 7/261 361/67 |
| 7,336,461 B2 | * | 2/2008 | Dupraz et al. ................... 361/71 |
| 7,616,419 B2 | * | 11/2009 | Koyama et al. .................. 361/71 |
| 2002/0133304 A1 | | 9/2002 | McClure et al. |
| 2006/0044157 A1 | | 3/2006 | Peters et al. |
| 2006/0273779 A1 | * | 12/2006 | Dupraz et al. ................. 324/150 |
| 2008/0123234 A1 | * | 5/2008 | Koyama et al. .................. 361/71 |
| 2010/0036538 A1 | | 2/2010 | Stergiou et al. |
| 2010/0161151 A1 | | 6/2010 | Yang et al. |
| 2011/0032650 A1 | * | 2/2011 | Hwan .................... H02H 3/066 361/71 |
| 2011/0125339 A1 | * | 5/2011 | Bright .......................... 700/293 |

* cited by examiner

*Primary Examiner* — Charles Kasenge
(74) *Attorney, Agent, or Firm* — Cantor Colburn LLP

(57) ABSTRACT

A device for interrupting a flow of electrical power in an electrical distribution system is provided. The electrical distribution network includes a circuit interrupting device, the circuit interrupting device having a reclose time. The device includes a sensor configured to generate a signal in the event of loss of system power. A switch is coupled to the electrical distribution system and is movable between an open and closed position. A controller is operably coupled to the sensor and the switch, the controller having a processor that initiates a timer in response to the signal and determines a measured reclose time with the timer. The processor is further responsive to actuate the switch in response to the measured reclose time is substantially equal to the reclose time of the at least one circuit interrupting device.

14 Claims, 8 Drawing Sheets

RECLOSER DEVICE AND METHOD OF OPERATION

BACKGROUND OF THE INVENTION

The subject matter disclosed herein relates to a recloser device for an electrical distribution system and in particular to a recloser device that can determine the presence of an electrical fault prior to closing.

Electrical utilities have a number of metrics that are used to track performance and customer satisfaction. These metrics, which include the system average interruption frequency index ("SAIFI"), the customer average interruption duration index ("CAIDI"), and for some utilities, the momentary average interruption frequency index ("MAIFI"). SAIFI measures the average number of interruptions that a customer would experience during a time period, such as a year. CAIDI measures the duration of the interruption that a customer would experience, and is generally a few hours per year. MAIFI measures the number of power interruptions that have a duration of less than five minutes that a customer would experience during a given time period.

Some or all of these metrics are also used by government regulators to aid in determining if the electrical utility is adhering to the regulations in maintaining a durable and reliable electrical distribution network. As a result, electrical utility and distribution companies have developed system architectures that minimize the duration and frequency of power outages. One technique uses a device called an "autorecloser" or simply "recloser", in the protection scheme for the distribution system. A recloser is a type of circuit breaker that includes a mechanism that allows the circuit breaker to close or reconnect the electric circuit after an electrical fault is detected. The premise of the recloser is that many electrical faults on the overhead open wire system are transitory, due to issues such as a tree limb touching or falling on a power line for example. The recloser includes a controller that is programmed to make several attempts to reconnect before locking open the recloser. Generally, the feeder recloser is programmed with an operating profile that provides for one "fast" trip and one to three "slow" trips before finally locking open.

Another technique used to improve performance is to arrange the electrical circuits in what is commonly referred to as an autoloop system. In an autoloop, the distribution network is divided into two or more branch circuits that can be adaptively coupled in the event of a failure. Generally, a substation will provide two or more feeder branch circuits to a typical autoloop. A feeder recloser is positioned at the beginning of the circuit and provides the protection functionality discussed above. A second recloser is positioned at an intermediate position along the branch circuit. The second recloser may be a "midpoint" type recloser that opens in response to a downstream fault. In addition or in place of the midpoint recloser, the system may include a sectionalizing recloser that opens in response to a downstream fault or may open in response to a loss of voltage. Positioned at the end of the branch circuit is a third type of recloser known as a "tie" recloser. The tie recloser couples the branch circuit with a similarly configured adjacent branch circuit. A sectionalizing recloser is different from a tie recloser in that a sectionalizing recloser will open in response to a fault that occurs downstream under normal current flow condition. A sectionalizing recloser will also open after a predetermined amount of time following a loss of voltage.

The tie recloser is normally in an open position to prevent the flow of electrical current between the branch circuits. In the event of a fault between the feeder and midpoint that the feeder recloser cannot clear, the feeder recloser locks open and results in a loss of potential on the entire branch circuit. When this occurs, the midpoint recloser changes settings to trip/open at a lower current level and lock open after only one trip. The tie recloser is arranged to automatically close at short period of time, typically 15 to 100 seconds, upon the detection of the loss of voltage potential. When the tie recloser connects the two branch circuits, electrical current can flow into the branch circuit with the electrical fault. Depending on where the fault is located on the branch circuit, partial electrical service can be restored to the portion of the branch circuit that experienced the failure. For example, if the fault occurs between the feeder recloser and the midpoint recloser, when the tie recloser connects the circuits, electrical power flows into the branch circuit. Since the fault is still present, the midpoint recloser trips and locks open. However, electrical power is still available for the customers between the sectionalizer/midpoint recloser and the tie recloser. Thus the average duration of electrical power loss and the amount of affected customers are minimized.

It should be appreciated that when the recloser closes to flow electrical power into the adjacent branch circuit, if there is a fault in the segment of the branch circuit between the recloser and the next fault protection device that the recloser will experience a fault condition. In some circumstances, the recloser may not react fast enough and an upstream protection device (such as a circuit breaker in the substation) may trip causing a loss of power in the circuit up to the point of the recloser. It should be appreciated that it is desirable to avoid closing a recloser device into an electrical fault.

Accordingly, while existing recloser devices are suitable for their intended purposes the need for improvement remains, particularly in determining if fault is present in an adjacent electrical network circuit segment.

BRIEF DESCRIPTION OF THE INVENTION

According to one aspect of the invention, a device for interrupting a flow of electrical power in an electrical distribution system having at least one circuit interrupting device is provided. The at least one circuit interrupting device having a reclose time. The device includes a sensor operably coupled to the electrical distribution system, the sensor configured to generate a signal in the event of loss of system power. A switching mechanism is coupled to the electrical distribution system, the switching mechanism movable between an open position and a closed position. A controller is operably coupled to the sensor and the switching mechanism, the controller having a processor that is responsive to executable computer instructions when executed on the processor for initiating a timer in response to the signal and determining a measured reclose time with the timer. Wherein the processor is further responsive to executable computer instructions for actuating the switching mechanism in response to the measured reclose time is substantially equal to the reclose time of the at least one circuit interrupting device.

According to another aspect of the invention, a method of operating a recloser device on an electrical distribution network having at least one other circuit interrupting device is provided. The at least one other circuit interrupting device having a reclose time. The method includes the steps of detecting a loss of system power. A timer is activated in response to detecting the loss of system power. A measured reclose time is determined. It is determined when the measured reclose time is substantially equal to the reclose time. A switch is actuated when the measured reclose time is substantially equal to the reclose time.

According to yet another aspect of the invention, a method of operating a device on an electrical distribution network having at least one overcurrent circuit interrupting device and a counter circuit interrupting device is provided. The at least one overcurrent circuit interrupting device having a reclose time. The method includes the steps of detecting a loss of system power due to a fault on the electrical distribution network. A timer is activated in response to detecting the loss of system power. A first measured reclose time is determined. It is determined when the first measured reclose time is substantially equal to the reclose time. The location of the fault is determined A switch is actuated.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of the present invention provide for a device configured to determine if a fault exists prior to connecting a first electrical network circuit to a second electrical network circuit that has experiences a loss of system. Embodiments of the present invention provide advantages in preventing loss of power on the first electrical network circuit when the fault occurs between the device and the immediately adjacent device. Embodiments of the present invention provide further advantages in reducing the risk of damage to the device when the fault occurs between the device and the immediately adjacent device. Embodiments of the present invention may be used in a variety of electrical distribution devices that are used to connect network circuits such as, but not limited to: reclosers, tie reclosers, and overcurrent tripping devices for example.

Figure 1:
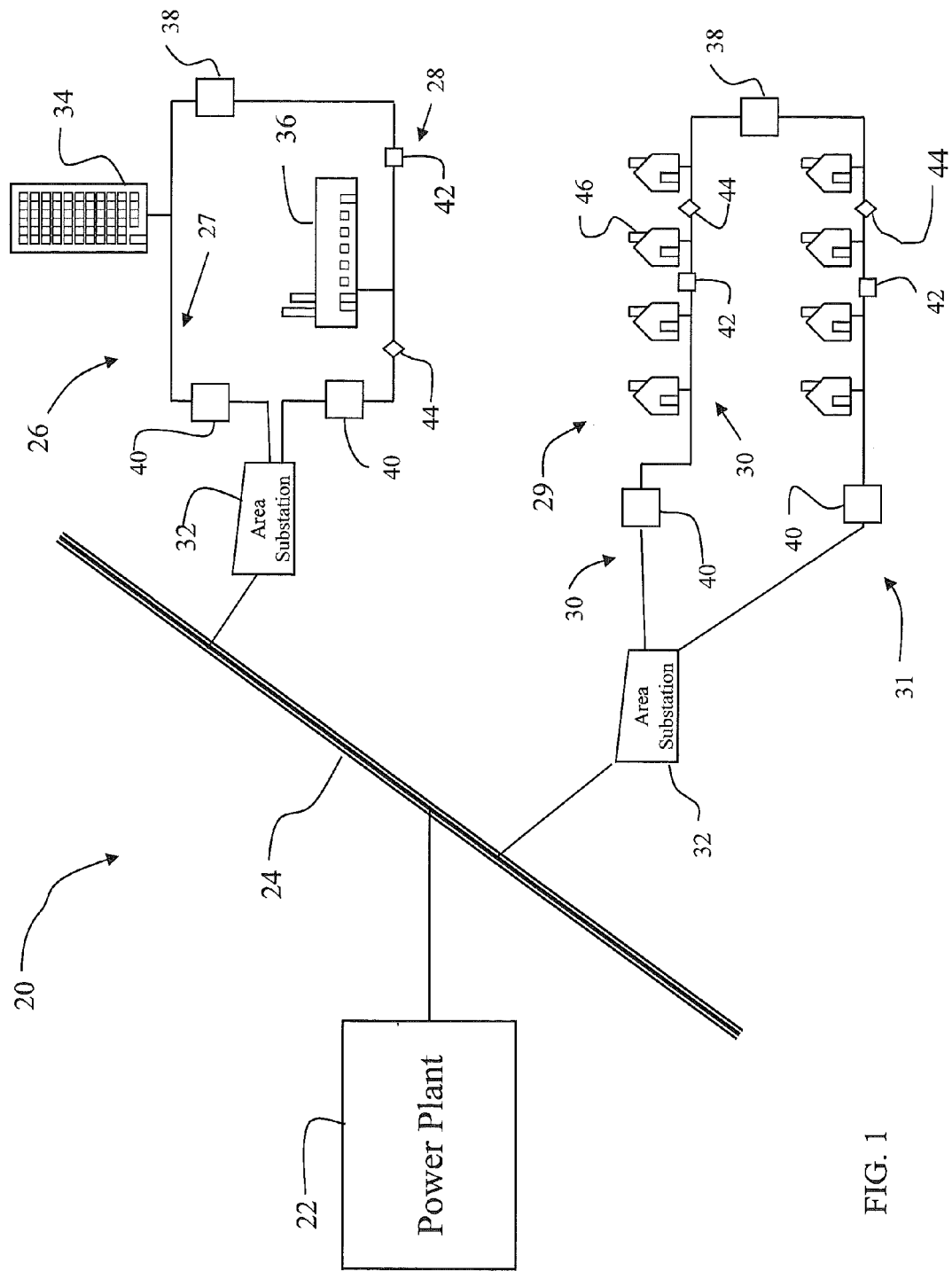
FIG. 1 is a schematic diagram of an electrical transmission and distribution network in accordance with an embodiment of the invention.

FIG. 1 illustrates an exemplary embodiment of a utility electrical distribution system 20. The utility system 20 includes one or more power plants 22 connected in parallel to a main transmission system 24. The power plants 22 may include, but are not limited to: coal, nuclear, natural gas, or incineration power plants for example. Additionally, the power plant 22 may include one or more hydroelectric, solar, or wind turbine power plants for example. It should be appreciated that additional components such as transformers, switchgear, fuses and the like (not shown) may be incorporated into the utility system 20 as needed to ensure the proper and efficient operation of the system. The utility system 20 is typically interconnected with one or more other utility networks to allow the transfer of electrical power into or out of the electrical system 20.

The main transmission system 24 typically consists of high transmission voltage power lines, anywhere from 69 KV to 500 KV for example, and associated transmission and distribution equipment which carry the electrical power from the point of production at the power plant 22 to the end users located on local electrical distribution systems 26, 29. The local distribution systems 26, 29 are connected to the main distribution system by area substations 32 which reduce transmission voltage to distribution levels such as 13 KV, 27 KV or 33 KV. Area Substations 32 typically contain one or more transformers, switching, protection, and control equipment. Area Substations 32 all include circuit breakers to interrupt faults such as short circuits or over-load currents that may occur. Substations 32 may also include equipment such as fuses, surge protection, controls, meters, capacitors, and load tap changers for voltage regulation.

The area substations 32 connect to one or more local electrical distribution systems, such as local distribution autoloop system 26, for example, that provide electrical power to a commercial area having end users such as an office building 34 or a manufacturing facility 36. As will be discussed in more detail below, the area substation 32 typically has two or more feeder circuits that provide electrical power to different feeder circuit branches 27, 28 of the local distribution network 26. A connection between the two portions 27, 28 of the local distribution network 26 is maintained through a device referred to as a tie recloser 38. During normal operations, the tie recloser 38 remains "open" to prevent the flow of electrical power between the local feeder branches 27, 28. The tie recloser 38 operates in conjunction with other circuit breakers or recloser devices 40 to form a radial automatic "autoloop" distribution system that improves performance of the utility system and minimizes the impact of a fault in one portion of the local distribution system.

The residential distribution system 29 includes one or more residential buildings 46 and light industrial or commercial operations. Similar to the commercial distribution network 26, the residential system 29 is divided into multiple branch feeders 30, 31 that are fed by the substation 32. Typically, the local distribution system 29 is arranged such that approximately up to 6 MVA of power is provided on each branch circuit of a five recloser autoloop for electrical loads such as residential buildings. Similar to the distribution autoloop 29, the branches 30, 31 are connected by a tie recloser 38 to form an autoloop. In addition to the tie recloser 38 and the feeder recloser 40, the local distribution network may include additional electrical control devices such as sectionalizing recloser 42 and remotely controlled reclosers 44. The reclosers 42, 44 may be similar to that described in commonly owned U.S. patent application Ser. No. 13/679,078 filed on Nov. 16, 2012 which is incorporated by reference herein in its entirety. The electrical control devices 42, 44 allow the utility network to further isolate faults in the local distribution networks and minimize the number customers affected by the loss of power.

It should be appreciated that the electrical network shown having two substations with one autoloop each is for exemplary purposes and each substation 32 may have any number of feeder circuits extending therefrom. Further, the electrical network may have any number of substations 32 that connect to the main transmission system 24.

Figure 2:
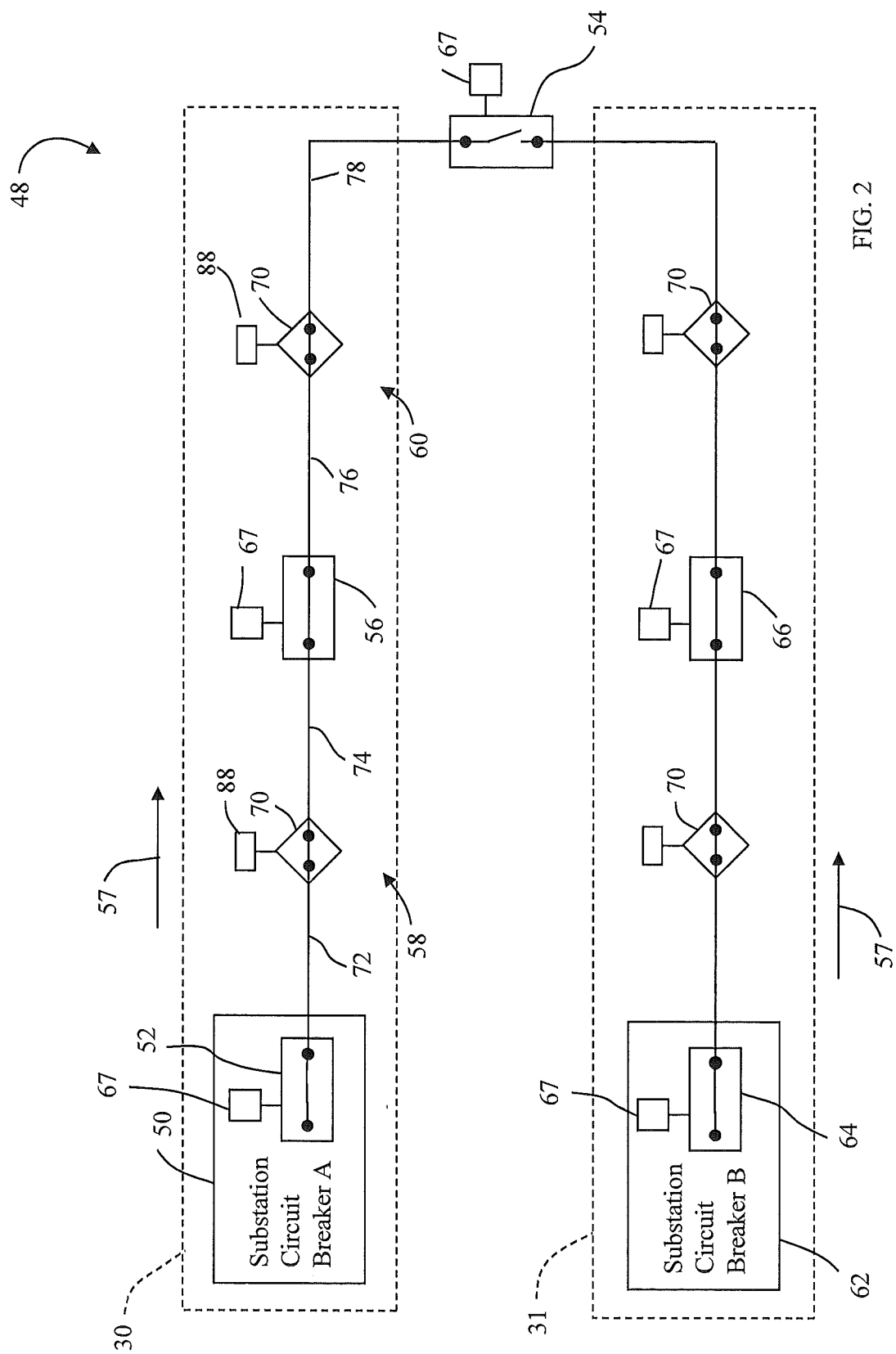
FIG. 2 is a schematic diagram of an autoloop configuration for an electrical distribution network in accordance with an embodiment of the invention.

Referring now to FIG. 2, an exemplary embodiment autoloop system 48 formed by the feeder branches 30, 31 is illustrated. In this embodiment, a first feeder 50 is located at the substation 32 to provide electrical power to the first branch circuit 30. A feeder recloser 52 is positioned to receive electrical power from the feeder 50 and transmit the electrical power to connected loads. As used herein, a recloser is a circuit breaker capable of interrupting electrical current to a protected circuit. The recloser further includes a mechanism that allows the recloser to automatically close (e.g. reconnect electrical circuits) after it has opened due to an electrical fault. The first branch circuit 30 terminates at a tie recloser 54. As discussed above, the tie recloser 54 remains open until the occurrence of an electrical fault in either the first branch circuit 30 or the second branch circuit 31. Between the feeder recloser 52 and the tie recloser 54 is a sectionalizing recloser 56. A sectionalizing recloser 56 is different from a tie recloser 54 in that a sectionalizing recloser 56 will open in response to a fault that occurs downstream under normal electrical current flow conditions (e.g. current flow in the direction indicated by arrow 57). It should be appreciated that electrical loads are connected to the first branch circuit 30 but are not illustrated here for the purpose of clarity. The reclosers 52, 54, 56 break the branch circuit 30 into segments 58, 60 that may be isolated in the event of an electrical fault.

Similar to the first branch circuit 30, the second branch circuit 31 includes a feeder 62 located at the substation 32. The feeder 62 provides electrical power to a feeder recloser 64. The second branch circuit 31 ends at the tie recloser 54 with a sectionalizing recloser 66 positioned in between.

Each of the reclosers 52, 54, 56, 64, 66 includes a controller 67 that provides command and control functionality for the recloser. The controller 67 may includes a communications device 84 (FIG. 3) for transmitting and receiving data and instructions along a communications connection (not shown). It should be appreciated that the communications connection may be any suitable communications means, including wired or wireless, capable of quickly and reliably transmitting information. In one embodiment, the communications connection is a radio connection in the 900 MHz spectrums. The communications connection may also be a leased telecommunications line (e.g. X.25, T1), a fiber network, a PSTN POTS network, a DSL telecommunications line, a cable telecommunications line, a microwave connection, a cellular connection, or a wireless connection using the IEEE 802.1 standard.

The controller 67 may be any suitable control device capable of receiving multiple inputs and providing control functionality to multiple devices based on the inputs. Controller 67 includes a processor 86 that is a suitable electronic device capable of accepting data and instructions, executing the instructions to process the data, and presenting the results. Processor may accept instructions through a user interface, or through other means such as but not limited to electronic data card, voice activation means, manually-operable selection and control means, radiated wavelength and electronic or electrical transfer. Therefore, the processor can be a microprocessor, microcomputer, a minicomputer, an optical computer, a board computer, a complex instruction set computer, an ASIC (embodiment specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, or a hybrid of any of the foregoing.

The controller 67 may include storage devices 88 such as read only memory (ROM), nonvolatile memory (NVM), and random access memory (RAM). The storage devices may comprise a magnetic, solid state, optical, or other storage media for storing embodiments, data, operating systems and other information. Controller 68 further includes operation control methods embodied in embodiment code, such as the logic diagram shown in FIG. 4 for example. These methods are embodied in computer instructions written to be executed by processor, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), PHP (hypertext preprocessor) and any combination or derivative of at least one of the foregoing. Additionally, an operator can use an existing software embodiment such as a spreadsheet or database and correlate various cells with the variables enumerated in the algorithms. Furthermore, the software can be independent of other software or dependent upon other software, such as in the form of integrated software.

In one embodiment, the autoloop system 48 may also include one or more counter reclosers 70 that allow further segmentation of the branch circuit. In the first branch circuit 30, there may be one counter recloser 70 between the sectionalizing recloser 56 and the feeder recloser 52. The counter recloser 70 further subdivides the segment 58 into a first segment 72 and a second segment 74. There may be another counter recloser 70 coupled between the sectionalizing recloser 56 and the tie recloser 54, which further subdivide the segment 60 into a third segment 76 and a fourth segment 78. The counter reclosers 70 are a recloser device having a switch and switching mechanism that stays closed until a predetermined criterion is satisfied. As will be discussed in more detail below, each of the recloser devices 52, 54, 56, 64,66 on a branch circuit 30, 31 has a reclose time that is different from the other devices on the branch the device is attached. As used herein, the term "reclose time" refers to the time period between when the device remains open in response to an electrical fault and it recloses to reconnect the circuit.

It should be appreciated that each branch circuit 30, 31 may include any number of counter reclosers or no counter reclosers depending on the configuration of the circuit. In the exemplary embodiment the counter reclosers may be similar to that described in aforementioned commonly owned U.S. patent application Ser. No. 13/679,078 filed on Nov. 16, 2012 or that described in U.S. patent application Ser. No. 13/529,218 filed on Jun. 21, 2012 which is incorporated herein by reference.

Each of the counter reclosers may also include a controller 67. In the exemplary embodiment, the counter reclosers may not have communications circuits that allow for communications with external devices and operate autonomously.

It should be appreciated that the second branch circuit 31 is similarly configured to the first branch circuit 30 and includes one or more counter reclosers 90. While for exemplary purposes, embodiments herein may refer to the operations of devices on the first branch circuit 30 in response to a fault, the claimed invention should not be so limited and the disclosed methods may be similarly performed by devices on the second branch circuit 31.

Figure 3:
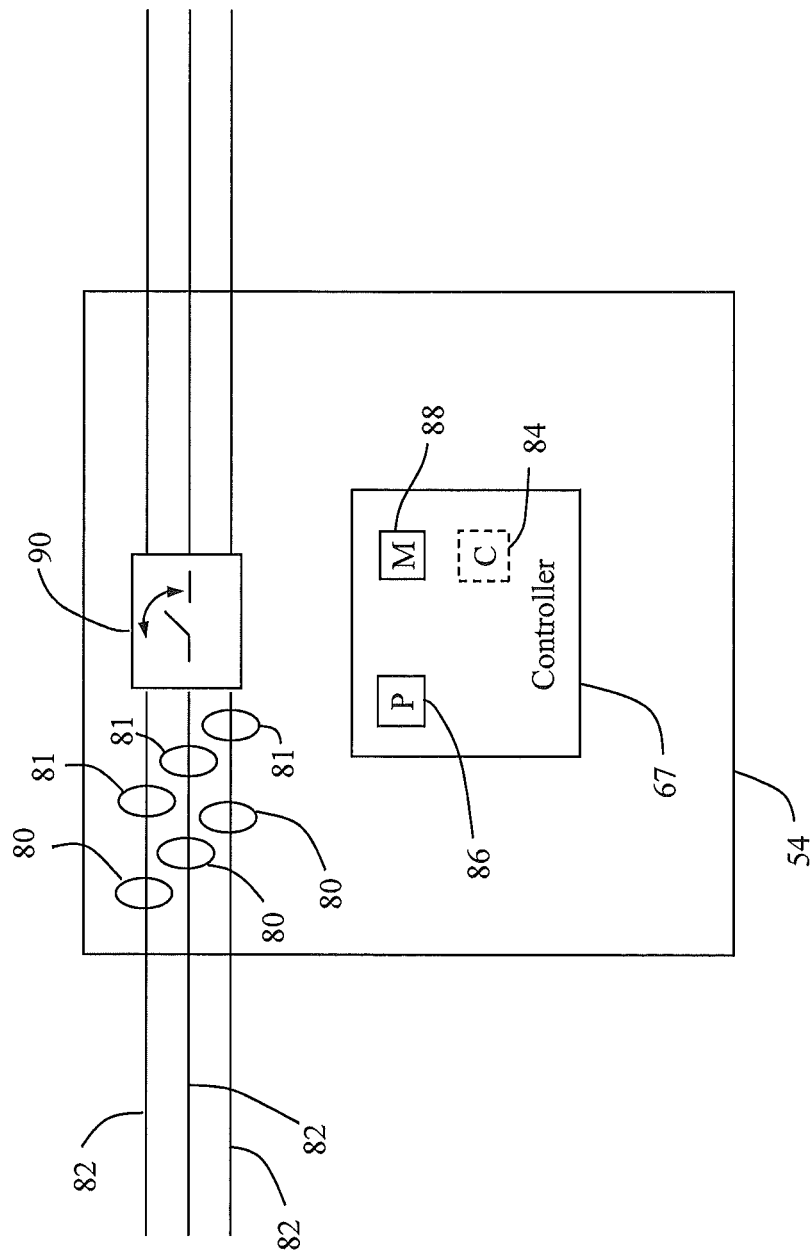
FIG. 3 is a schematic representation of a recloser device in accordance with an embodiment of the invention.

Referring now to FIG. 3, a recloser device is shown, such as the tie recloser 54 for example. It should be appreciated that while embodiments herein refer to the tie recloser 54, this is for exemplary purposes and the control methodology and system described herein may be incorporated into any device that automatically connects network circuits. In one embodiment, the counter recloser 54 may include multiple sensors, such as current transformers 80, with each associated with one or more of the electrical phases 82. The current transformers 80 and voltage transformers 81 are coupled to transmit a signal to the controller 67. The controller 67 is configured to actuate a switching mechanism 90 in response to receiving a signal from the current transformers 80. In one embodiment, the signal from the current transformers 80 and voltage transformers 81 allows the controller 67 to determine if there is a loss of system power. As used herein the term "system power" means that no/low voltage or current is detected by the device. In one embodiment, the voltage threshold is set to be at least or equal to 10% below the lowest voltage expected during a fault. This arrangement of operating on system voltage provides the advantage of avoiding having to initiate an activity (e.g. initiating timers, counting voltage loss, and actuating switch 90) in the event of a sagging voltage.

In the exemplary embodiment, the predetermined criteria may be user defined to provide coordination between the devices. As used herein, the term "coordination" refers to configuring electrical protection devices, such as reclosers, circuit breakers and switches for example, to allow the devices closest to the fault to open, thus reducing the impact of the fault to those loads coupled to the segment where the fault occurs.

Figure 4:
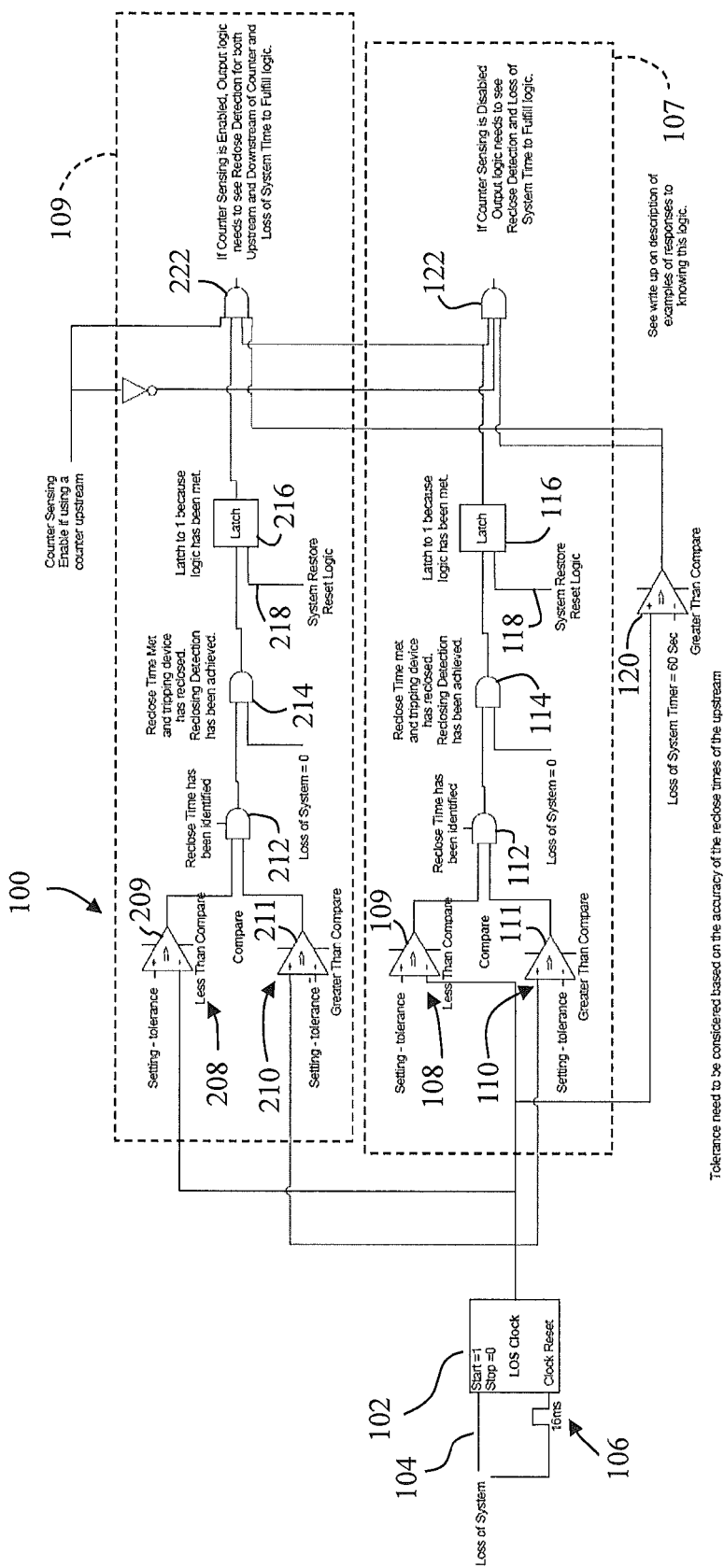
FIG. 4 is a schematic diagram of the control logic for the recloser device of FIG. 3 for normal overcurrent devices and when a counter device is used upstream of the recloser device.

One embodiment of a detector device 100 is shown in FIG. 4 for use with either three-phase interruption or single-phase interruption devices, such as tie recloser 54 for example. As used herein, a single-phase interruption device is a device, such as a recloser, that may interrupt power flow on a single electrical phase of a multiphase system. This type of device may be used to clear a fault on a single phase (e.g. a branch falling on a power line) without interrupting power on all three phases. The detector device 100 determines whether the adjacent recloser device has opened and reclosed, whereby the location of the fault may be determined.

The detector device 100 includes a timer 102 that is initiated upon signal indicating a loss of system power 104. Each time there is a loss of system power, timer 102 begins counting. It stops counting when the system power is restored. A pulse 106 will reset the timer 102 each time a loss of system power occurs to reset the clock. The pulse 106 should be configured to account for inaccuracies or tolerances in the operation of other devices (e.g. reclosers) in network circuit.

The detector device 100 further includes a first logic circuit 107 and a second logic circuit 109. Since an upstream recloser device will open and then reclose in response to a fault, the timer 102 allows the determination of a measured reclose time of the upstream device using first logic circuit 107. However, if the adjacent upstream device is not an overcurrent type of device, such as a counter recloser described in the aforementioned U.S. patent application Ser. No. 13/679,078 or U.S. patent application Ser. No. 13/529,218 for example, then the second logic circuit 109 determines if the fault is upstream or downstream from the counter type device. Since overcurrent type devices will automatically trip upon detection of the fault, as is discussed below, the first logic circuit 107 can identify the tripping device through its recloser time. Thus if the adjacent upstream device is tripped in response to a fault, the location of the fault can determined by the detector device 100. However, counter type devices may not directly trip in response to a fault, so the overcurrent tripping device identified by detector device 100 may be several devices upstream. It should be appreciated that this would make it more difficult to determine where the fault is located. In this case, the second logic circuit 109 is used in conjunction with the first logic circuit 107. The first logic circuit 107 would determine if the adjacent upstream tripping device is opening and closing. The second logic circuit 109 will determine the location of the fault (upstream or downstream) relative to the counter type device.

The first logic circuit 107 includes a pair of comparators that monitor the lower tolerance setting 108 and an upper tolerance setting 110. The clock goes through a high limit comparator 109 and low limit comparator 111 to detect when the reclose time of an adjacent recloser device is within these two limits. When the measured reclose time is between the upper and lower threshold limits, the AND gate 112 goes high and the recloser detection time has been satisfied. In other words, the upper and lower time limits represent a reclose time that allows the device 100 to identify if the adjacent recloser has opened and reclosed. As mentioned above, each device on the branch circuit has a different reclose time, therefore the reclose device that has opened and reclosed may be identified.

If the loss of system is greater than these settings, the logic can be met while passing through the two limits. To avoid a mis-operation another AND gate 114 waits to see if the loss of system power gets restored. This would indicate the device 100 detected the reclose time within the comparator 109, 111 thresholds before system power was restored. In most applications, the adjacent recloser will open and reclose multiple times, allowing the device 100 to determine the correct (e.g. the adjacent recloser device) reclose time has been detected.

Once the logic of AND gate 114 has been satisfied, the device 100 is latched in block 116 to hold the logic detection. In the exemplary embodiment, the logic may only be reset 118, if the system has been restored for a prescribed amount of time or manually reset through other means.

The second logic circuit 109 operates in a similar manner having a pair of comparators that monitor the lower tolerance setting 209 and an upper tolerance setting 211. The clock goes through a high limit comparator 209 and low limit comparator 211 to detect a first reclose time and a second reclose time of an adjacent overcurrent device is within these two limits. When the measured reclose time is between the upper and lower threshold limits, the AND gate 212 goes high and the recloser detection time has been satisfied. In other words, the upper and lower time limits represent the detection of the multiple opening and reclosing of the adjacent upstream overcurrent type device. This indicates that the counter-type device has not opened and the fault must be upstream of the intermediate counter-type device. Where only a single open and reclose is detected of the adjacent upstream overcurrent type of device, this indicates that the counter-type device has opened and the fault is downstream of the counter-type device.

If the loss of system is greater than these settings, the logic can be met while passing through to the two limits. To avoid a mis-operation another AND gate 214 waits to see if the loss of system power gets restored. This would indicate the device 100 detected the reclose time within the comparator 209, 211 thresholds before system power was restored.

Once the logic of AND gate 214 has been satisfied, the device 100 is latched in block 216 to hold the logic detection. In the exemplary embodiment, the logic may only be reset 218, if the system has been restored for a prescribed amount of time or manually reset through other means.

Once the logic has been met and latched in block 116, 216 the device 100 will wait for a final loss of system power with comparator 120. A loss of system power that exceeds the comparator 120 threshold indicates the adjacent recloser device is now open and will cease to reclose. Once block 116, 216 have been latched and the comparator 120 threshold has been met, AND gate 122, 222 is satisfied. The detector device 100 can perform a variety of operations as discussed in FIGS. 5-12 below.

Figure 5:
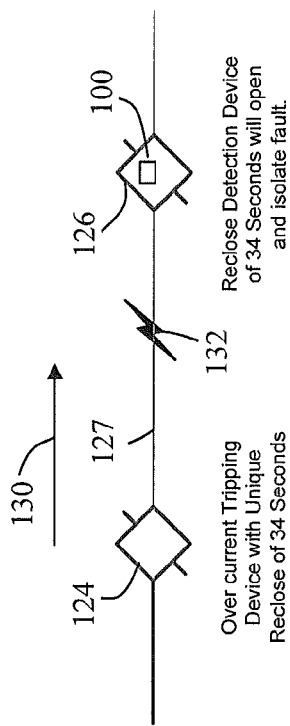
FIGS. 5-11 are schematic diagrams of portions of electrical networks illustrating fault locations and different fault scenarios.

Referring now to FIG. 5, an embodiment is shown of a portion of branch circuit, such a branch circuit 30 for example, where two recloser devices 124, 126 are arranged in series with a circuit segment 127 in between. Here, the adjacent upstream device is a overcurrent type device, so only the first logic circuit 107 is enabled. Under normal operating conditions, the current flows in the direction indicated by the arrow 130. Both recloser devices 124, 126 are normally closed during operation. In other words, the recloser 126 is not a tie recloser. In the event of a fault 132 in the segment 127, the device 124 will open to clear the fault. The device 124 then recloses after a predetermined amount of time (e.g. 34 seconds). The device 124 will open again if the fault 132 is still present and then reclose after the predetermined amount of time. This continues until the device 124 has opened a predetermined amount of time whereupon it will lock open.

When the recloser device 124 opens, the device 126 detects of a loss of system power in segment 127. The recloser device 126 includes a device 100 which initiates the timer in response to the loss of system power. When the device 100 detects the reclose time of the device 124 (e.g. 34 seconds), it is determined that it is the adjacent recloser device 124 that is opening. Therefore the fault 132 must be along segment 127. The device 100 then initiates an opening process in recloser device 126 (e.g. opening switch 90). This isolates the fault on segment 127 and allows the downstream portion of the circuit to be energized, such as by closing tie recloser 56 for example.

Figure 6:
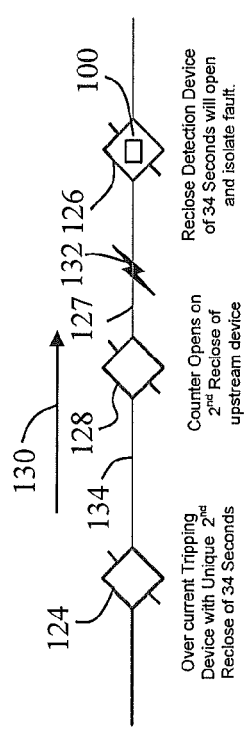

Referring now to FIG. 6, another embodiment is shown of a branch circuit having three devices 124, 126, 128 arranged in series. In this embodiment, the recloser device 128 is a counter recloser, thus both the first logic circuit 107 and the second logic circuit 109 is enabled. A fault occurs on segment 127 causing the recloser device 124 to open as discussed above. In this embodiment, the counter recloser 128 is configured to lock open after a predetermined number of openings (e.g. 2) by recloser device 124. Since recloser device 124 has a defined reclose time (e.g. 34 seconds), the device 100 detects that the device 124 has opened and the timer logic is initiated as described above. Once the counter recloser 128 opens, there will be a loss of system power at device 126. In this case, the second logic circuit 109 will detect only a single open and reclose by the device 124 since counter recloser 128 has opened. As a result, once the loss of system power has occurred for a predetermined amount of time (to satisfy comparator 120), the recloser device 126 will lock open to isolate the fault 132 on the segment 127. Since the fault is isolated on segment 127, the recloser device 124 will reclose and not detect a fault (after counter recloser 128 has opened). Thus electrical power is restored to segment 134.

Figure 7:
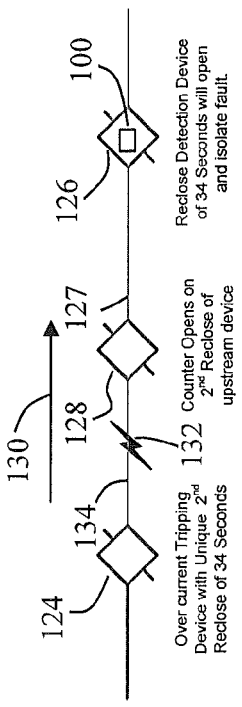

Referring now to FIG. 7 an embodiment is shown which is configured the same as FIG. 6, except that the fault 132 occurs on the segment 134. Here again, the counter device 128 is arranged between the adjacent overcurrent device 124 and the device 126. It should be noted in this scenario that both device 128 and 126 may be utilizing logic 100 to fulfill this scenario. In this embodiment, the recloser device 124 will detect the fault and opens for a predetermined amount of time (e.g. 34 seconds). The counter recloser 128 opens when reclose detection of the predetermined amount of time (e.g. 34 seconds) is detected with logic 107 enabled, recloser 126 requires 107 and 109 enabled in this scenario. Recloser 126 will detect logic 107 of the predetermined amount of time (e.g. 34 seconds) of the reclosing device 124. When device 126 does not detect another predetermined reclose detect on logic 109, the recloser device 126 will remain closed and electrical power may be restored to the segment 127 by back feeding (e.g. by closing tie recloser 56). By not seeing the second reclose logic would be because device 128 had opened and isolated this fault already.

Figure 8:
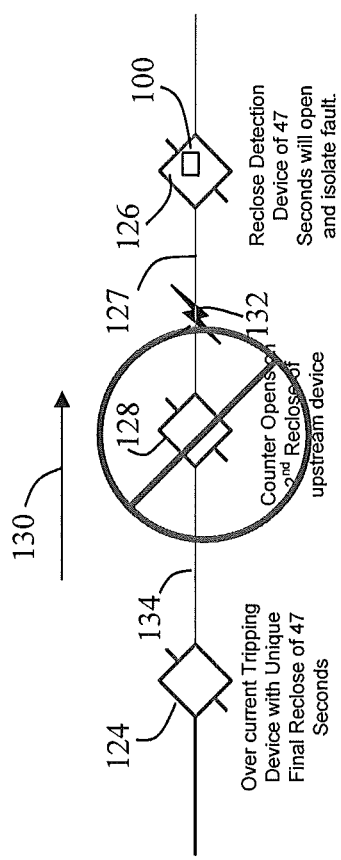

Referring now to FIG. 8, an embodiment is shown where a device closest to the detection device 100, such as counter recloser 128, is taken out of service, such as for maintenance for example. The detection device 100 can either have its setting (i.e. disable the second logic circuit 109) changed by downloading a new one, have a list of reclose detection times that can be picked from a list for each downstream device, or if remote communications is possible, a new reclose detect time can be downloaded to now detect the next downstream devices reclose times.

Figure 9:
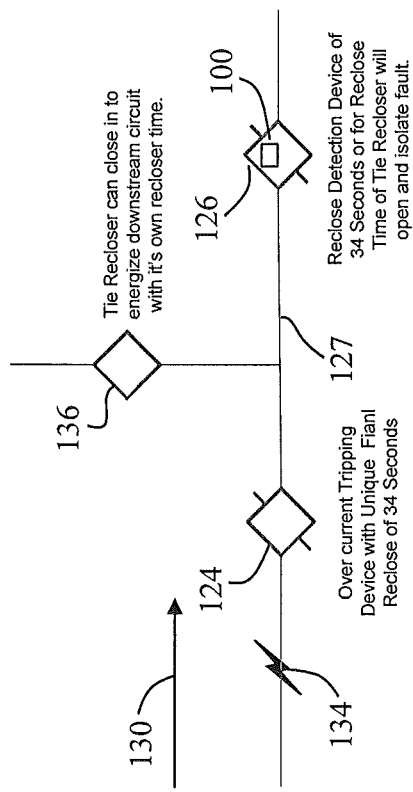

Referring now to FIG. 9, an embodiment is shown where a tie recloser 136 is connected to segment 127 between the recloser devices 124, 126. It should be appreciated that the tie recloser 136 is normally open and electrical power is provided to the segment 127 from the recloser device 124. It should further be appreciated that since there are no intermediate counter-type devices, that only the first logic circuit 107 would be enabled. If a fault 134 were to happen upstream of the recloser device 124 and the recloser device 124 opened for loss of system power, the tie recloser 136 may then close in to supply electrical power to the downstream portion of the circuit. To handle a second contingency of a subsequent fault occurring between the tie recloser 136 and the detection device 100, the tie recloser 136 may either have the same reclose time as the recloser device 124 or if different the detection device 100 can have settings to trip for either of the tie recloser 136 or recloser device 124 reclose times. These settings may change due to a detected reclose event or remotely via SCADA.

Figure 10:
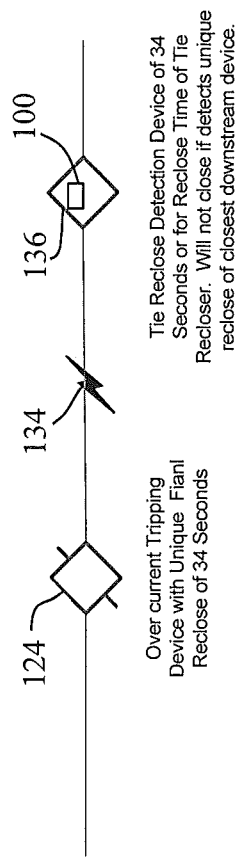

Referring now to FIG. 10, an embodiment is shown where the fault 134 is located between a recloser device 124 and an open tie recloser 136. Here, there is no intermediate counter-type device, so only the first logic circuit will be enabled. With the fault 136 between the two devices 124, 136, the tie recloser 136 will detect the recloser device 124 reclose time and not close in when the loss of system power times out. Note that a loss of system power for a tie recloser 136 is just loss of voltage and it is desirable to take into account sagging voltage to improve the reliability of the detection.

If there is not fault detection when the tie recloser 136 times out of its loss of system power, the tie recloser 136 will then close expecting not to close into a fault. The tie recloser 134 should still have tripping functions for either direction in case the detection did not work properly or if the tie recloser 136 was closed manually and the fault then took place.

Figure 11:
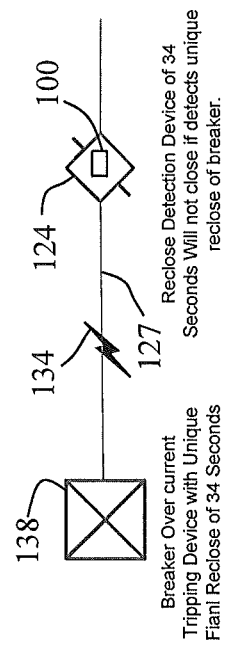

Referring now to FIG. 11, an embodiment is shown with a circuit breaker 138 arranged in series with a recloser device 124 having a detection device 100. The detection device 100 will detect the fault 134 and the recloser device 124 will open to isolate the fault 134. If the detection device 100 does not see a fault, the recloser device 124 will remain closed waiting to power that segment 127 from the alternate source. To improve reliability, the circuit breaker 138 should open any time there is a fault of "loss of it system" at the substation to assure that the detecting device 100 does not allow the recloser device 124 to remain closed and back feed electrical power into the substation through a closed circuit breaker 138 that did not open for all fault possibilities or loss of system power.

It should be appreciated that while embodiments herein describe the process of detecting the reclose time period for determining the location of a fault in reference to a recloser or circuit breaker type of device, this is for exemplary purposes and the claimed invention should not be so limited. This process may also be incorporated into other types of devices such as capacitor banks or voltage regulators to assist the electrical network operators in identifying the location of the fault.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A device for interrupting a flow of electrical power in an electrical distribution system having a radial circuit with at least one circuit interrupting device, the radial circuit being coupled to an adjacent circuit by an open switch, the at least one circuit interrupting device having a reclose time, the device comprising:
    a sensor operably coupled to the radial circuit, the sensor configured to generate a signal in the event of loss of system power, the loss of system power includes substantially no voltage and current measured by the sensor;
    a switching mechanism coupled to the electrical distribution system, the switching mechanism movable between an open position and a closed position;
    a controller operably coupled to the sensor and the switching mechanism, the controller having a processor that is responsive to executable computer instructions when executed on the processor for initiating a timer in response to the signal and determining a measured reclose time with the timer; and
    wherein the processor is further responsive to executable computer instructions for actuating the switching mechanism in response to the measured reclose time is substantially equal to the reclose time of the at least one circuit interrupting device;
    wherein the controller further includes a first logic circuit and a second logic circuit, the first logic circuit determines when an upstream tripping device is opening and closing based at least in part on the timer, the upstream tripping device configured to open when an overcurrent condition is present, and the second logic circuit determines when a location of a fault is upstream or downstream from the device.

2. The device of claim 1 wherein the switching mechanism moves from the closed position to the open position when the measured reclose time is substantially equal to the reclose time of the at least one circuit interrupting device.

3. The device of claim 1 wherein the switching mechanism moves from the open position to the closed position when the measured reclose time is substantially equal to the reclose time of the at least one circuit interrupting device.

4. The device of claim 1 wherein the processor is further responsive to executable computer instructions for actuating the switching mechanism in response to determining a time since loss of system power has exceeded a threshold.

5. A device for interrupting a flow of electrical power in an electrical distribution system having at least one circuit interrupting device, the at least one circuit interrupting device having a reclose time, the device comprising:
    a sensor operably coupled to the electrical distribution system, the sensor configured to generate a signal in the event of loss of system power;
    a switching mechanism coupled to the electrical distribution system, the switching mechanism movable between an open position and a closed position;
    a controller operably coupled to the sensor and the switching mechanism, the controller having a processor that is responsive to executable computer instructions when executed on the processor for initiating a timer in response to the signal and determining a measured reclose time with the timer;
    wherein the processor is further responsive to executable computer instructions for actuating the switching mechanism in response to the measured reclose time is substantially equal to the reclose time of the at least one circuit interrupting device;
    wherein the processor is further responsive to executable computer instructions for actuating the switching mechanism in response to determining a time since loss of system power has exceeded a threshold; and
    wherein the processor is further responsive to executable computer instructions for comparing the timer to a first threshold and a second threshold and determining when the measured reclose time is between the first threshold and the second threshold.

6. A method of operating a recloser device on an electrical distribution network having a radial circuit at least one other circuit interrupting device, the at least one other circuit interrupting device having a reclose time, the radial circuit being coupled to an adjacent circuit by an open switch, the method comprising:
    detecting a loss of system power on the radial circuit, the loss of system power includes substantially no voltage and no current;
    activating a timer in response to detecting the loss of system power;
    determining a measured reclose time;
    determining when the measured reclose time is substantially equal to the reclose time;
    determining when an upstream tripping device is opening and closing based at least in part on the measured reclose time;
    determining the location of a fault relative to the recloser device;
    actuating a switch when the measured reclose time is substantially equal to the reclose time; and
    determining when a time since loss of system power has exceeded a first time threshold, wherein the actuating of the switch is in response to the measured reclose time being substantially equal to the reclose time and the first time threshold being exceeded.

7. The method of claim 6 wherein the actuating of the switch includes moving the switch from a closed position to an open position.

8. The method of claim 6 wherein the actuating of the switch includes moving the switch from an open position to a closed position.

9. The method of claim 6 further comprising comparing the measured reclose time to a second threshold and a third threshold.

10. A method of operating a recloser device on an electrical distribution network having at least one other circuit interrupting device, the at least one other circuit interrupting device having a reclose time, the method comprising:

detecting a loss of system power, the loss of system power including substantially no voltage and no current;

activating a timer in response to detecting the loss of system power;

determining a measured reclose time;

determining when the measured reclose time is substantially equal to the reclose time; and actuating a switch when the measured reclose time is substantially equal to the reclose time;

determining when a time since loss of system power has exceeded a first time threshold, wherein the actuating of the switch is in response to the measured reclose time being substantially equal to the reclose time and the first time threshold being exceeded;

comparing the measured reclose time to a second threshold and a third threshold; and wherein the measured reclose time is substantially equal to the reclose time when the measured reclose time is between the second threshold and the third threshold.

11. The method of claim 10 further comprising latching when the measured reclose time is substantially equal to the reclose time.

12. A method of operating a device on an electrical distribution network having a radial circuit with at least one overcurrent circuit interrupting device and a counter circuit interrupting device, the overcurrent circuit interrupting device being arranged upstream from the counter circuit interrupting device, the at least one overcurrent circuit interrupting device having a reclose time, the radial circuit being coupled to an adjacent circuit by an open switch, the method comprising:

detecting a loss of system power due to a fault on the radial circuit, the loss of system power includes substantially no voltage and no current;

activating a timer in response to detecting the loss of system power;

determining a first measured reclose time;

determining when the first measured reclose time is substantially equal to the reclose time;

determining with the counter circuit interrupting device when the overcurrent circuit interrupting device is opening and closing based in part on the first measured reclose time;

determining the location of the fault relative to the counter circuit interrupting device;

actuating a switch;

determining a second measured reclose time; and determining the location of the fault is upstream of the counter circuit interrupting device in response to determining the second measured reclose time.

13. The method of claim 12 wherein the actuating of the switch includes moving the switch from a open position to a closed position when the second measured reclose time is substantially equal to the reclose time.

14. The method of claim 13 further comprising:

determining when a time since loss of system power has exceeded a first time threshold, wherein the actuating of the switch is in response to the measured reclose time being substantially equal to the reclose time and the first time threshold being exceeded;

comparing the measured reclose time to a second threshold and a third threshold; and wherein the second measured reclose time is substantially equal to the reclose time when the measured reclose time is between the second threshold and the third threshold.

\* \* \* \* \*